(12) United States Patent
Tsai et al.

(10) Patent No.: US 8,843,521 B2
(45) Date of Patent: Sep. 23, 2014

(54) METHOD FOR ANALYZING DATA UTILIZING WEIGHTED SUFFIX TREE

(75) Inventors: Meng-Feng Tsai, Taoyuan County (TW); Min-Feng Wang, Kaohsiung (TW); Cheng-Hsien Tang, Taipei (TW); Bo-Ru Song, New Taipei (TW); Ching-Hsuan Shen, Taipei (TW); Hsin-Fu Su, Yunlin County (TW); Chi-Sheng Huang, Changhua County (TW)

(73) Assignee: National Central University, Taoyuan County (TW)

( * ) Notice: Subject to any disclaimer, the term of this patent is extended or adjusted under 35 U.S.C. 154(b) by 216 days.

(21) Appl. No.: 13/542,679

(22) Filed: Jul. 6, 2012

(65) Prior Publication Data
US 2013/0179393 A1    Jul. 11, 2013

(30) Foreign Application Priority Data
Jan. 6, 2012   (TW) .............................. 101100592 A

(51) Int. Cl.
G06F 17/30    (2006.01)
(52) U.S. Cl.
USPC ........................................................ 707/790
(58) Field of Classification Search
USPC ................. 707/709, 737, 749, 600, 790, 797; 715/700; 704/9
See application file for complete search history.

(56) References Cited

U.S. PATENT DOCUMENTS

| 5,953,006 | A  | * | 9/1999 | Baker et al. ................... 715/700 |
| 7,418,455 | B2 | * | 8/2008 | Fan et al. .............................. 1/1 |
| 7,941,420 | B2 | * | 5/2011 | Chitrapura et al. ........... 707/709 |
| 8,352,247 | B2 | * | 1/2013 | Cherepanov et al. ............. 704/9 |
| 8,589,398 | B2 | * | 11/2013 | Sundaresan et al. .......... 707/737 |
| 8,676,815 | B2 | * | 3/2014 | Deng et al. .................... 707/749 |
| 2009/0307213 | A1 | * | 12/2009 | Deng et al. ........................ 707/5 |

OTHER PUBLICATIONS

Min-Feng Wang et al.; "Exploiting Frequent Episodes in Weighted Suffix Tree to Improve Intrusion Detection System", 22nd International conference on Advanced Information networking and Applications—Workshops—2008.*

M.-F. Wang, Y.-L. Kuo, M.-F. Tsai, C.-H. Tang and K. Huang, Hierarchical Role Classification based on Social Behavior Analysis, Proceedings of the 8th International Conference on Advances in Mobile Computing and Multimedia, pp. 426-429, Nov. 8-10, 2010; Paris, France.

(Continued)

Primary Examiner — Hung T Vy
(74) Attorney, Agent, or Firm — CKC & Partners Co., Ltd.

(57) ABSTRACT

A method for analyzing data utilizing a weighted suffix tree includes receiving at least one original data sequence. An original data sequence ID is assigned to the original data sequence, and the original data sequence includes an original datums. A weighted suffix tree is constructed according to the original datums of the original data sequence. The weighted suffix tree includes several nodes, and each node includes a weight set which is formed by the original data sequence ID. Group information for classifying the original datums into several groups is received. The nodes of the weighted suffix tree belonging to a same group are merged according to the group information. Data is analyzed according to the weighted suffix tree after being merged.

5 Claims, 6 Drawing Sheets

(56) References Cited

OTHER PUBLICATIONS

M.-F. Wang, Y.-C. Wu and M.-F. Tsai, Exploiting frequent episodes in weighted suffix tree to improve intrusion detection system, Proceedings of the 22th International Conference on Advanced Information Networking and Applications, pp. 1246-1252, Mar. 25-28, 2008; Okinawa, Japan.

E. M. McCreight, A Space-Economical Suffix Tree Construction Algorithm, J. ACM, vol. 23, No. 2, pp. 262-272, 1976.

E. Ukkonen, On-Line Construction of Suffix Trees, Algorithmica, vol. 14, No. 3, pp. 249-260, 1995.

P. Weiner, Linear Pattern Matching Algorithm, Proc. of the 14th IEEE Symp. on Switching and Automata Theory, pp. 1-11, 1973.

H. Mannila, H. Toivonen, and A. I. Verkamo, Discovering Frequent Episodes in Sequences, Proc. of the 1st Int'l Conf. on Knowledge Discovery in Databases and Data Mining, pp. 210-215, Montreal, Canada, 1995. URL: http://infolab.stanford.edu/~cgzhu/QualPaper/FreqItemset/Mannila_sequence.pdf.

K. Ilgun, R. A. Kemmerer, P. A. Porras, State transition analysis: A rule-based intrusion detection approach, IEEE Transactions on Software Engineering, 1995 URL:http://ieeexplore.ieee.org/xpl/articleDetails.jsp?tp=&arnumber=372146&queryText%3DState+transition+analysis%3A+A+rule-based+intrusion+detection+approach.

S. Kumar, E. H. Spafford, A software architecture to support misuse intrusion detection, In Proceedings of the 18th National Information Security Conference, pp. 194-204, 1995. URL: http://citeseerx.ist.psu.edu/viewdoc/summary?doi=10.1.1.159.2516.

Yi Lu and C.I. Ezeife, Position Coded Pre-order Linked WAP-Tree for Web Log Sequential Pattern Mining, PAKDD, LNAI 2637, pp. 337-349, 2003. URL:http://link.springer.com/chapter/10.1007%2F3-540-36175-8_33.

Yi-Ming Lee, Mining Self-derivable Multilevel FP-tree From a Transactional Database, National Central University Computer Science and Information Engineering Master's thesis, Taiwan, 2006. URL: http://thesis.lib.ncu.edu.tw/ETD-db/ETD-search/view_etd?URN=93522072.

Yen-Ching Wu, Exploiting Frequent Episodes in Weighted Suffix Tree to Improve Intrusion Detection System, National Central University Computer Science and Information Engineering Master's thesis, Taiwan, 2007. URL: http://thesis.lib.ncu.edu.tw/ETD-db/ETD-search/view_etd?URN=945202040.

Chun-han Tseng, Intrusion Detection Using Function-based Sequences of System Calls, National Central University Computer Science and Information Engineering Master's thesis, Taiwan, 2008. URL: http://thesis.lib.ncu.edu.tw/ETD-db/ETD-search/view_etd?URN=955202035.

Yi-ling Kuo, Hierarchical Role Classification based on Social Behavior Analysis, National Central University Computer Science and Information Engineering Master's thesis, Taiwan, 2010. URL: http://thesis.lib.ncu.edu.tw/ETD-db/ETD-search/view_etd?URN=975202072.

Min-Feng Wang, Yen-Ching Wu, and Meng-Feng Tsai, Cheng-Hsien Tang, Sequential Pattern Discovery for Intrusion Detection System, The 10th International Symposium on Communications and Information Technologies, ISCIT 2010. URL: http://ieeexplore.ieee.org/xpls/abs_all.jsp?arnumber=5664887&tag=1.

\* cited by examiner

| Original data sequence ID | Original data sequence |
|---|---|
| 1 | AB |
| 2 | ED |
| 3 | ABCD |
| 4 | AD |
| 5 | CA |
| 6 | ED |

METHOD FOR ANALYZING DATA UTILIZING WEIGHTED SUFFIX TREE

RELATED APPLICATIONS

This application claims priority to Taiwan Application Serial Number 101100592, filed Jan. 6, 2012, which is herein incorporated by reference.

BACKGROUND

1. Technical Field

The present invention relates to a method for analyzing data utilizing a weighted suffix tree.

2. Description of Related Art

In the past few years, the fast growing social networks has been re-shaping social relations and consuming modes of people. As a result, social network analysis has become a key technique to analyze social relations of an individual or a group in different scenes according to the collection of social information or behaviors.

In the social network analysis, analyzing dependency about influence and information propagation path is a popular and raising field of study. In such study, individual influence ability for each user in the social network is evaluated according to the correlations of propagating behavior performed in his/her social network, and the valuable results are frequently applied to for word-of-mouth marketing.

Most prior arts put emphasis on influence paths to evaluate propagation correlations between the individuals, which therefore generate extensive data, so that such study give a complicated result with limited utilization.

On the other hand, in astronomy domain it is important to correctly classify heavenly bodies. Recently, many astronomical observation methods and hardware are developed for generating observation data with more details, which also leads to a tremendously large amount of data and raise difficulty for data mining.

SUMMARY

According to one embodiment of this invention, a method for analyzing data utilizing a weighted suffix tree is disclosed to classify nodes in a weighted suffix tree into several groups for merging and integration. The method for analyzing data utilizing a weighted suffix tree may take the form of a computer is program product stored on a computer-readable storage medium having computer-readable instructions embodied in the medium. The method for analyzing data utilizing a weighted suffix tree includes the following steps:

(a) at least one original data sequence is received. Wherein, an original data sequence ID is assigned to the original data sequence, and the original data sequence includes an original datums.

(b) a weighted suffix tree is constructed according to the original datums of the original data sequence. Wherein, the weighted suffix tree includes several nodes, and each node includes a weight set which is formed by the original data sequence ID.

(c) group information for classifying the original datums into several groups is received.

(d) the nodes of the weighted suffix tree belonging to a same group are merged according to the group information.

(e) data is analyzed according to the weighted suffix tree after being merged.

The present invention can achieve many advantages. The information represented in the weighted suffix tree can be simplified but information stored in the same can still be maintained after being merged. In addition, since the weighted suffix tree generated by one embodiment of this invention is simplified, the computing complexity for data analyzing with such weighted suffix tree can be reduced. In one embodiment of this invention, influence paths in the social network can be used as the original data sequences to be analyzed applying the present invention. In another embodiment of this invention, astronomical observation patterns can be used as the original data sequences to be analyzed applying the present invention. Hence, the complicated sequence, such as influence paths in the social network and astronomical observation patterns, can be analyzed to generate simplified data relation. In some embodiments, the data after being analyzed can be output or displayed on a display unit (for example, a monitor), which gives a easy way for users to perform further data mining. In some other embodiments, the original datums can be classified into several groups for further merging, which can simplify the weighted suffix tree. In addition, different group information can be provided to classify the original datums in different ways, which give flexibility to analyze data.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
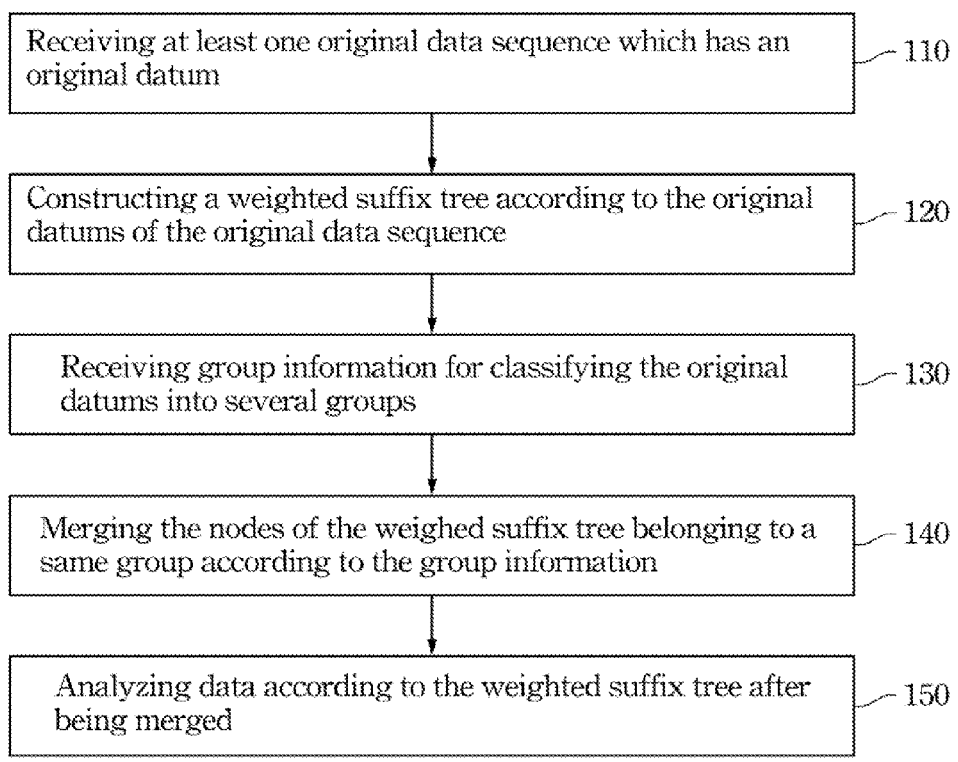
FIG. 1 is a flow diagram of a method for analyzing data utilizing a weighted suffix tree.

Reference will now be made in detail to the present embodiments of the invention, examples of which are illustrated in the accompanying drawings. Wherever possible, the same reference numbers are used in the drawings and the description to refer to the same or like parts.

As used herein, the singular forms "a," "an" and "the" include plural referents unless the context clearly dictates otherwise. Therefore, reference to, for example, a data sequence includes aspects having two or more such sequences, unless the context clearly indicates otherwise.

Referring to FIG. 1, a flow diagram illustrates a method for analyzing data utilizing a weighted suffix tree according to an embodiment of this invention. In the method for analyzing data utilizing a weighted suffix tree, nodes in a weighted suffix tree are classified into several groups for merging and integration. The method for analyzing data utilizing a weighted suffix tree may take the form of a computer program product stored on a computer-readable storage medium having computer-readable instructions embodied in the medium. Any suitable storage medium may be used including non-volatile memory such as read only memory (ROM), programmable read only memory (PROM), erasable programmable read only memory (EPROM), and electrically erasable programmable read only memory (EEPROM) devices; volatile memory such as static random access memory (SRAM), dynamic random access memory (DRAM), and double data rate random access memory (DDR-RAM); optical storage devices such as compact disc read only memories (CD-ROMs) and digital versatile disc read only memories (DVD-ROMs); and magnetic storage devices such as hard disk drives (HDD) and floppy disk drives.

Figures 2, 3:
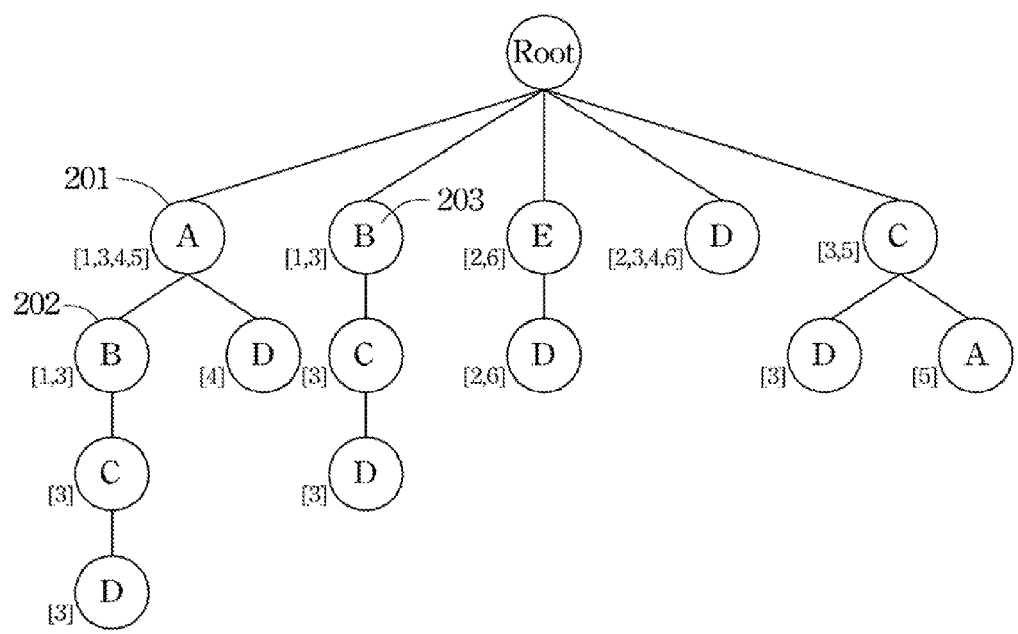
FIG. 2 is a table of an original data sequence according to one embodiment of this invention.
FIG. 3 illustrates a weighted suffix tree according to an original data sequences.

The method 100 for analyzing data utilizing a weighted suffix tree includes the following steps:

At step 110, at least one original data sequence which has an original datum is received. Wherein, an original data sequence ID is assigned to the original data sequence. In one embodiment of this invention, the original datums form the original data sequence with their propagation order. Referring to FIG. 2, a table of an original data sequence according to one embodiment of this invention is shown. The table of FIG. 2 stores original data sequence IDs "1" to "6" of the original data sequences for receiving at step 110. For example, in the original data sequence with the original data sequence ID "1," the original datums "A→B" are stored sequentially. In other embodiments, the original data sequence is formed by the original datums in other types of orders, which should not be limited to this disclosure.

At step 120, a weighted suffix tree is constructed according to the original datums of the original data sequence. Wherein, the weighted suffix tree includes several nodes, and each node includes a weight set which is formed by the original data sequence ID. Referring to FIG. 3, a weighted suffix tree is illustrated according to the original data sequences in FIG. 2. For example, the original data sequence with the original data sequence ID "1" may form suffixes "A→B" and "B." Hence, the original data sequence ID "1" is assigned to the node 201 and 202, which indicates the suffix "A→B." In addition, the original data sequence ID "1" is also assigned to the node 203, which indicates the suffix "B."

At step 130, group information for classifying the original datums into several groups is received. In one embodiment, the original datums with similar properties are classified into a same group. For example, A and B are classified into the group C1, C and D are classified into the group C2, and E is classified into the group C3. In some embodiments, such group information for classification can be input by users or be generated by algorithms for receiving at step 130.

Figure 4:
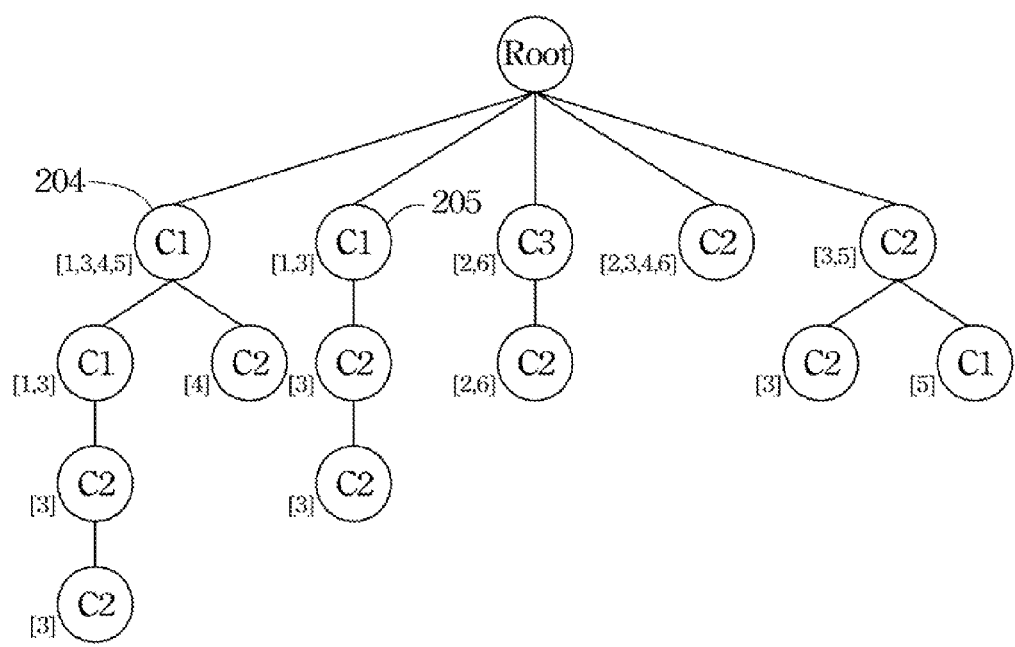
FIG. 4 illustrates an amended weighted suffix tree.

Subsequently, at step 140, the nodes of the weighted suffix tree belonging to a same group are merged according to the group information. In some embodiments, the nodes in the weighted suffix tree are first replaced with the corresponding group according to the group information for merging at step 140. After the node replacement, the weighted suffix tree in FIG. 3 may be modified to generate the weighted suffix tree in FIG. 4.

Figure 5:
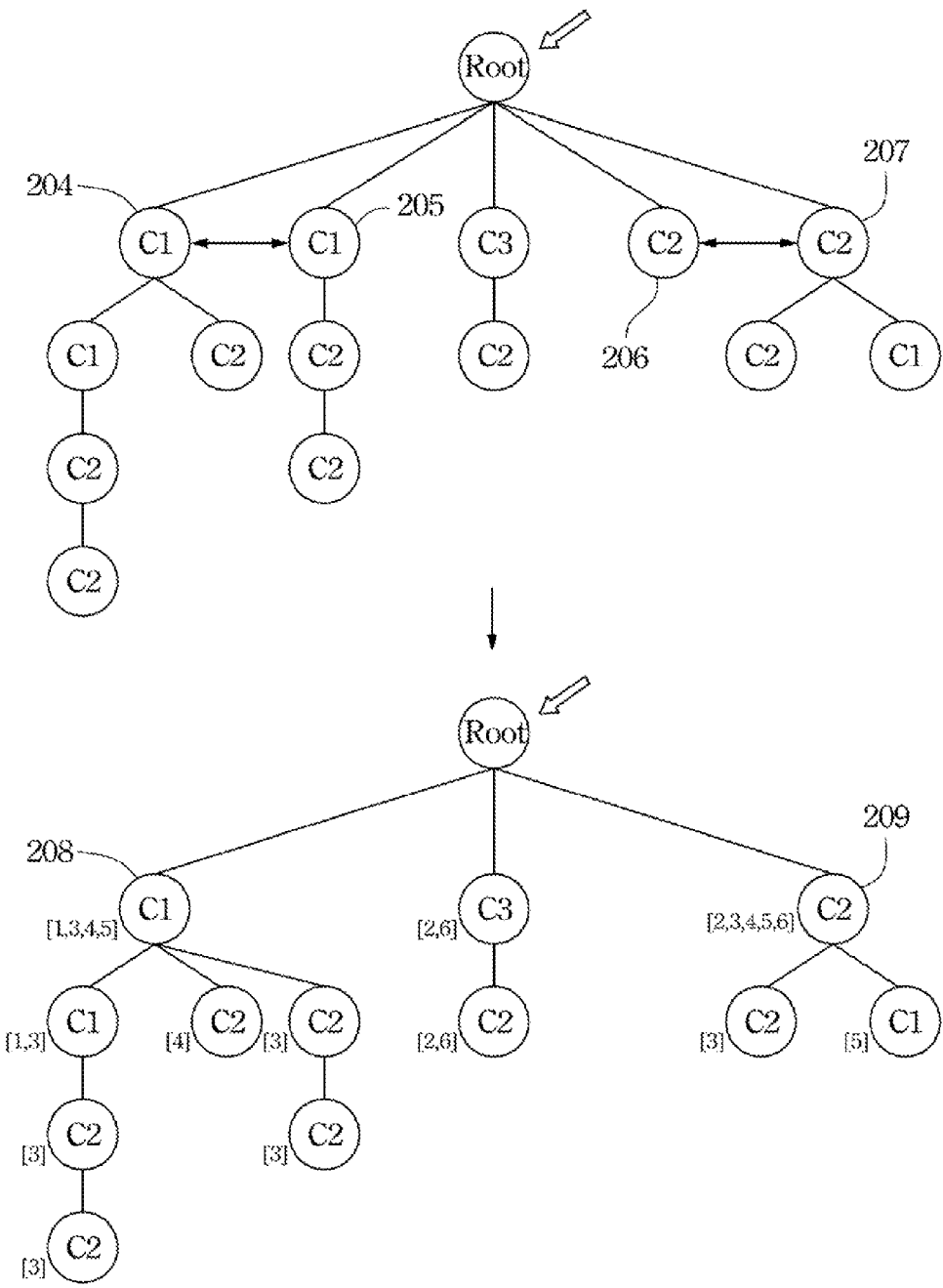
FIG. 5 illustrates an embodiment about merging neighboring nodes in the weighted suffix tree.

Then, the nodes in the weighted suffix tree belonging to a same group can be merged. In one embodiment of this invention, merging neighboring nodes in the weighted suffix tree may be performed. FIG. 5 illustrates an embodiment about merging neighboring nodes in the weighted suffix tree in FIG. 4. Referring to FIG. 5, since the neighboring nodes 204 and 205 at the same level are both replaced with C1, the nodes 204 and 205, as a result, are merged to generate a merged node 208. Similarly, since the neighboring nodes 206 and 207 at the same level are both replaced with C2, the nodes 206 and 207, are accordingly merged to generate a merged node 209. During the merging process, since the weight set of the node 204 is "1, 3, 4, 5" and the weight set of the node 205 is "1, 3", the merged weight set of the merged node 208 may be generated as "1, 3, 4, 5" according to the weight sets of the node 204 and 205. In addition, their children nodes can be connected to the merged nodes.

Figure 6:
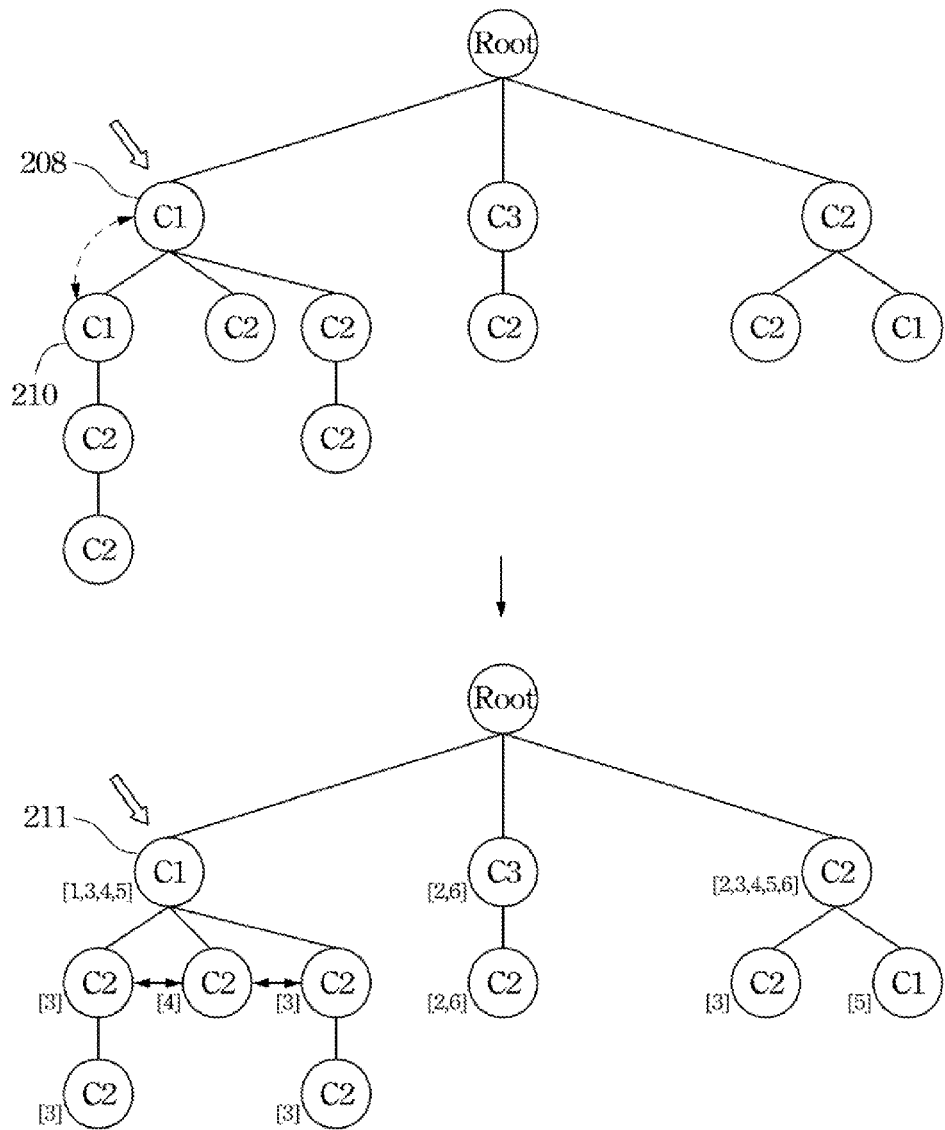
FIG. 6 illustrates an embodiment about merging hierarchical nodes in the weighted suffix tree.
Figure 7:
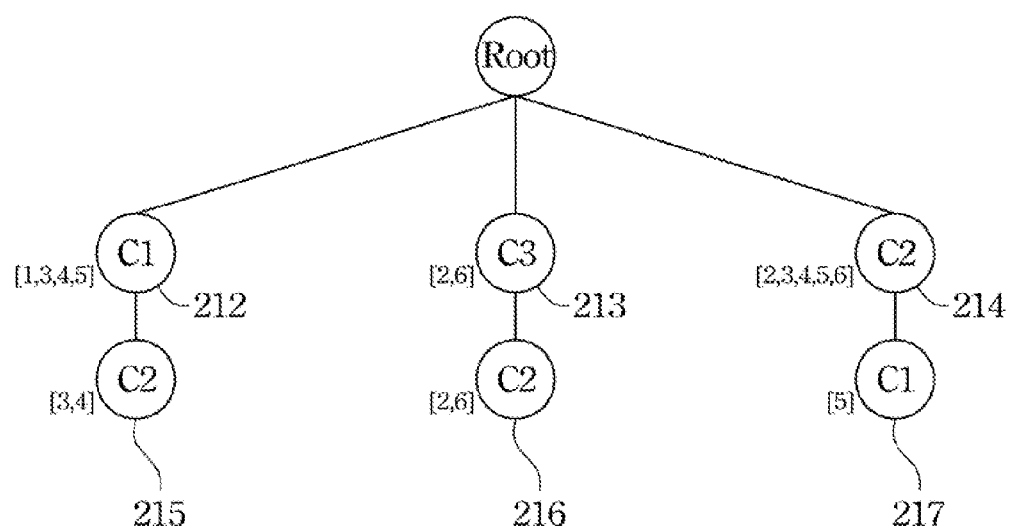
FIG. 7 illustrates an embodiment of a weighted suffix tree after being merged.

In another embodiment, merging hierarchical nodes in the weighted suffix tree may be performed. FIG. 6 illustrates an embodiment about merging hierarchical nodes in the weighted suffix tree in FIG. 5. Referring to FIG. 6, since the hierarchical nodes 208 and 210, which are connected to each other at different levels, are both replaced with C1, the nodes 208 and 210, as a result, are merged to generate a merged node 211. During the merging process, since the weight set of the node 208 is "1, 3, 4, 5" and the weight set of the node 210 is "1, 3", the merged weight set of the merged node 211 may be generated as "1, 3, 4, 5" according to the weight sets of the node 208 and 210. In addition, the process for merging neighboring nodes or hierarchical nodes can be performed for several times to generate a weighted suffix tree after being merged (as shown in FIG. 7.) In some other embodiments, the process for merging neighboring nodes or hierarchical nodes is performed in different orders beginning from the root of the weighted suffix tree, which should not be limited in this disclosure. Therefore, the node number of the weighted suffix tree can be reduced after the merging but information stored in the same can still be maintained after being merged.

At step 150, data is analyzed according to the weighted suffix tree after being merged. For example, as shown in FIG. 7, since the sequence "C3→C2" can be found in the sequence with the sequence ID "2" and "6" (which are fetched from the weight set of the node 216). Therefore, it is determined that the propagation order "C3→C2" has the highest order, which indicates that dependence relation between C3 and C2 is the highest.

In another embodiment of step 150, data analyzing can be performed according to at least one weight set of at least one children node of the at least one first layer node of the weighted suffix tree after being merged. For example, the weighted suffix tree in FIG. 7 includes first layer node 212, 213, 214. Since the weight set of the node 212 has the highest amount of original data sequence Ids "1, 3, 4, 5," it is determined that C1 is the group which can propagate information to the highest amount of different sequence.

In still another embodiment of step 150, data can be analyzed according to amount of at least one children node of the at least one first layer node. Since the amount of the children node of the first layer node 212, 213, 214 are all 1, the first layer node 212, 213, 214 can propagate information to similar amount of groups.

The present invention can achieve many advantages. The information represented in the weighted suffix tree can be simplified but information stored in the same can still be maintained after being merged. In addition, since the weighted suffix tree generated by one embodiment of this invention is simplified, the computing complexity for data analyzing with such weighted suffix tree can be reduced. In one embodiment of this invention, influence paths in the social network can be used as the original data sequences to be analyzed applying the present invention. In another embodiment of this invention, astronomical observation patterns can be used as the original data sequences to be analyzed applying the present invention. Hence, the complicated sequence, such as influence paths in the social network and astronomical observation patterns, can be analyzed to generate simplified data relation. In some embodiments, the data after being analyzed can be output or displayed on a display unit (for example, a monitor), which gives a easy way for users to perform further data mining. In some other embodiments, the original datums can be classified into several groups for further merging, which can simplify the weighted suffix tree. In addition, different group information can be provided to classify the original datums in different ways, which give flexibility to analyze data.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method for analyzing data utilizing a weighted suffix tree, comprising the steps of:
    (a) receiving an original data sequence having an original datum, wherein an original data sequence ID is assigned to the original data sequence;
    (b) constructing a weighted suffix tree according to the original datums of the original data sequence, wherein the weighted suffix tree comprises a plurality of nodes, and each of the nodes comprises a weight set being formed by the original data sequence ID;
    (c) receiving group information for classifying the original datums into a plurality of groups;
    (d) merging the nodes of the weighted suffix tree belonging to a same group of the groups according to the group information, further comprising:
        replacing the nodes of the weighted suffix tree with an ID of the groups corresponding to the same; and
        merging the nodes of the weighted suffix tree being replaced, which are connected to or neighboring to each other and the ID of which are the same, to generate at least one merged node; and
    (e) analyzing data according to the weighted suffix tree after being merged.

2. The method for analyzing data utilizing a weighted suffix tree of claim 1, further comprising:
    generating a merged weight set for the at least one merged node according to the weight set of the nodes being merged.

3. The method for analyzing data utilizing a weighted suffix tree of claim 1, wherein step (e) comprises:
    analyzing data according to the weight sets of the nodes of the weighted suffix tree after being merged.

4. The method for analyzing data utilizing a weighted suffix tree of claim 1, wherein the weighted suffix tree after being merged comprises at least one first layer node, step (e) comprises:
    analyzing data according to at least one weight set of at least cine children node of the at least one first layer node.

5. The method for analyzing data utilizing a weighted suffix tree of claim 1, wherein the weighted suffix tree after being merged comprises at least one first layer node, step (e) comprises:
    analyzing data according to amount of at least one children node of the at least one first layer node.

* * * * *